United States Patent [19]

Giles et al.

[11] 4,267,104
[45] May 12, 1981

[54] DYES FROM SELECTED SUBSTITUTED ANILINE DIAZO COMPONENTS AND ANILINE COUPLERS CONTAINING SULFATE ESTER GROUPS

[75] Inventors: Ralph R. Giles; Max A. Weaver, both of Kingsport, Tenn.

[73] Assignee: Eastman Kodak Company, Rochester, N.Y.

[21] Appl. No.: 48,562

[22] Filed: Jun. 14, 1979

[51] Int. Cl.³ .................. C09B 29/033; C09B 29/036; C09B 29/085; C09B 29/26
[52] U.S. Cl. .............................. 260/207.3; 260/152; 260/157; 260/158; 260/206; 260/207; 260/207.1; 260/208; 260/458 C; 564/86; 564/163; 564/202; 564/442; 564/443
[58] Field of Search ............ 260/158, 152, 157, 207.3, 260/206, 207, 207.1

[56] References Cited

U.S. PATENT DOCUMENTS

| | | | |
|---|---|---|---|
| 2,225,651 | 12/1940 | McNally et al. | 260/205 |
| 2,261,175 | 11/1941 | McNally et al. | 260/205 |
| 2,615,013 | 10/1952 | Dickey | 260/207.3 |
| 2,615,014 | 10/1952 | Dickey | 260/207.3 |

FOREIGN PATENT DOCUMENTS 2443482  3/1976  Fed. Rep. of Germany ........ 260/207.3

Primary Examiner—Floyd D. Higel
Attorney, Agent, or Firm—Donald W. Spurrell; Daniel B. Reece, III

[57] ABSTRACT

Disclosed are new azo dyes prepared by diazotizing selected substituted anilines and coupling with aniline couplers containing sulfate ester groups. These dyes impart fast yellow to reddish-orange shades on polyamide fibers and also color cellulose acetate and wool. The dyes have the following general formula:

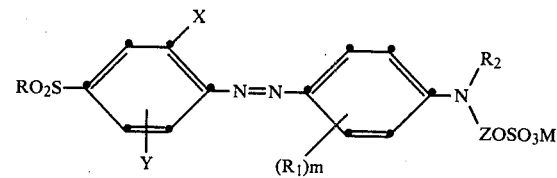

wherein R is selected from a variety of groups such as alkyl, alkoxy, aryl, cycloalkyl, aryloxy, $NH_2$, and NH alkyl; X is hydrogen, halogen, alkyl, or the like; Y is hydrogen or halogen; $R_1$ is selected from groups such as hydrogen, alkyl, alkoxy, halogen, acylamido, alkylthio, and aryloxy; $R_2$ is selected from such groups as hydrogen, alkyl, aryl and cycloalkyl; Z is a linking group such as alkylene; M is $H^+$, $Na^+$, $K^+$, or $NH_4^+$; and m is 0, 1, or 2.

6 Claims, No Drawings

DYES FROM SELECTED SUBSTITUTED ANILINE DIAZO COMPONENTS AND ANILINE COUPLERS CONTAINING SULFATE ESTER GROUPS

This invention relates to new azo dyes from certain substituted anilane diazo components and certain aniline couplers containing sulfate ester groups. These dyes impart fast yellow to reddish-orange shades on polyamide fibers and also color cellulose acetate and wool.

The dyes of this invention have the following general formula:

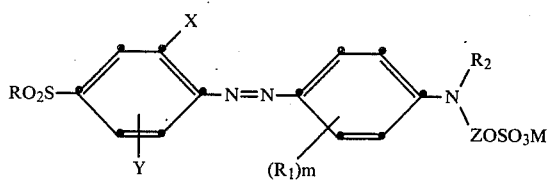

wherein R is selected from alkoxy, aryl, cycloalkyl, aryloxy, $NH_2$, NH alkyl, NH aryl, $N(alkyl)_2$, N(alkyl)aryl,

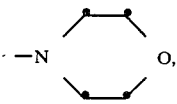

alkyl, and alkyl substituted with 1-3 groups selected from hydroxy, phenyl, alkoxy, alkoxyalkoxy, alkanoylamino, and alkanoyloxy; X is hydrogen, halogen, alkyl, or alkoxy; Y is hydrogen or halogen; $R_1$ is selected from hydrogen, alkyl, alkoxy, halogen, acylamido, alkylthio, and aryloxy; $R_2$ is selected from hydrogen, aryl, cycloalkyl, and alkyl; m is 0, 1, or 2; M is $Na^+$, $K^+$, $H^+$, or $NH_4^+$; Z is selected from straight or branched chain alkylene which may be substituted with aryl, halogen, $OSO_3M$, alkoxy, or aryloxy, $-CH_2(CH_2)_nX-CH_2(CH_2)_p-$, where n is 1, 2 or 3, p is 0, 1, 2 or 3, and X is O, S, $SO_2$, $-SO_2NH-$, $-SO_2N(alkyl)-$, $SO_2N(aryl)-$, $-N(SO_2 aryl)-$, $-NHCO-$, $-NHCONH-$, $-N(SO_2 alkyl)-$, and $-CON(alkyl)-$; wherein in all of the above groups containing alkyl, alkylene, or cyclic radicals, such radicals may bear up to three substituents selected from hydroxy, alkoxy, aryl, aryloxy, cyclohexyl, furyl, alkylcyclohexyl, aroyloxy, alkoxycarbonyl, alkanoyloxy, sulfamoyl, $SO_2NH(aryl)$, $SO_2NH(alkyl)$, $SO_2N(dialkyl)$, NHCOO(alkyl), NHCONH(alkyl), acylamido, lower alkylsulfonamido, succinimido, glutarimido, phthalimido, 2-pyrrolidono, cyano, carbamoyl, alkylcarbamoyl, alkoxyalkoxy, alkylthio, halogen, arylthio, alkylsulfonyl, and arylsulfonyl; wherein the alkyl or alkylene moieties of the above groups are straight or branched of 1-6 carbons; and wherein the aryl moieties of the above groups are of 6-12 carbons.

The dyes of this invention impart yellow to reddish-orange shades on fibers, particularly polyamides, and are especially useful for dyeing polyamide (nylon) carpets, giving good fastness to light, ozone, oxides of nitrogen, washing, sublimation, crocking, and the like, and having good leveling, transfer, exhaustion, and build properties.

The substituted anilines used in this invention are prepared according to known procedures. The dyes may be prepared by reacting an intermediate coupler containing one or more hydroxy groups with sulfuric acid to produce a sulfate ester, which is then coupled with a diazonium salt to give the dye, or by coupling an intermediate coupler containing one or more hydroxy groups with the diazonium salt and then reacting the dye with sulfuric acid to produce the sulfate ester.

The dyes may be isolated when M is $H^+$, but are usually isolated as the sodium or potassium salts.

The following examples will further illustrate these preparative methods.

COUPLER PREPARATIONS

EXAMPLE 1

Preparation of N-Ethyl-N-2-Sulfatoethyl-m-Toluidine

To 75 ml of concentrated sulfuric acid is added 53.8 g of N-ethyl-N-2-hydroxyethyl-m-toluidine with stirring, keeping the temperature below 50° C. The solution is stirred for 2 hr. and the temperature allowed to drop. Thin-layer chromatography shows an essentially complete reaction. The viscous reaction mixture is drowned in ice-water and diluted to a total volume of about 900 ml. The coupler solution is then used to prepare the dyes without further treatment.

EXAMPLE 2

Preparation of N-Ethyl-N-2-Sulfatoethylaniline

To 25 ml of concentrated sulfuric acid is added 16.5 g of N-ethyl-N-2-hydroxyethylaniline at less than 40° C. After stirring 2 hr. and allowing the temperature to drop, the reaction mixture is added to 200 g of ice and diluted to a total volume of about 250 ml. An aliquot of this coupler solution is used without further treatment.

EXAMPLE 3

Preparation of N,N-bis(2-Sulfatoethyl)-m-toluidine

N,N-bis(2-hydroxyethyl)-m-toluidine (1 g) is added to 3 g of concentrated sulfuric acid, allowed to stand at room temperature, and the reaction mixture added to 20 g of ice. The solution is used to prepare dyes.

The following are typical coupler types bearing hydroxy groups which may be treated in a similar manner as described above to produce sulfate groups.

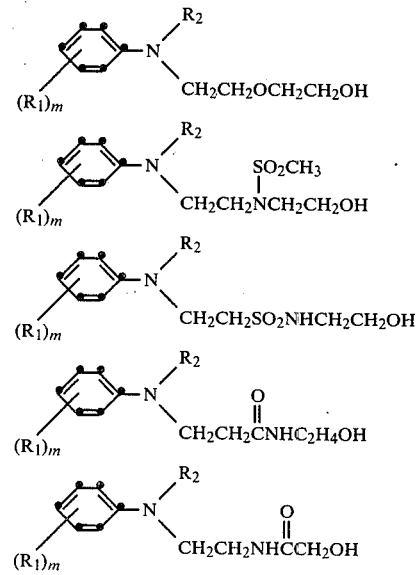

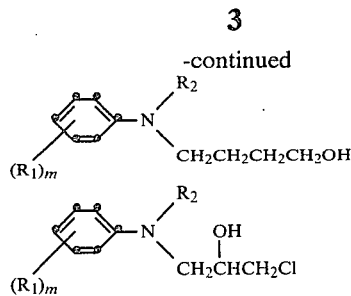

-continued

7. N-(2-Sulfatoethyl)-o-chloroaniline
8. 3-Chloro-2-methyl-N-(2-sulfatoethyl)aniline
9. 2-Methoxy-5-methyl-N-(2-sulfatoethyl)aniline
10. 2,5-Dimethyl-N-(2-sulfatoethyl)aniline
11. 2,5-Dichloro-N-(2-sulfatoethyl)aniline
12. 5-Acetamido-2-methyl-N-(2-sulfatoethyl)aniline
13. N-(3-Chloro-2-sulfatopropyl)-N-ethyl-m-toluidine

PREPARATION OF DYES—METHOD II

Reaction of Hydroxy Containing Dye With Sulfuric Acid

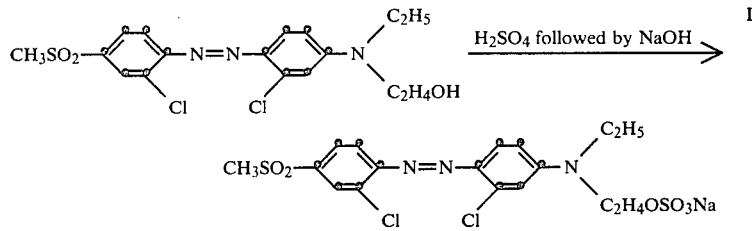

PREPARATION OF THE DYES—METHOD I

EXAMPLES 4–13

Diazotization and Coupling of 2-Chloro-4-Methylsulfonylaniline

To 91.7 g of 93% $H_2SO_4$ is added 7.2 g of $NaNO_2$ allowing the temperature to rise to 80° C. The solution is cooled and 100 g (1 part propionic acid: 5 parts acetic acid) is added below 20° C. The slurry is cooled to 0°–5° C. and 20.5 g. (0.1 mole) of 2-chloro-4-methylsulfonylaniline is added portionwise. An additional 100 g. of 1:5 acid is added and stirring continued for 2 hr. at 0°–5° C. Each of the couplers listed below as Examples 4–13 is added to water, or a 0.005 mole aliquot of the coupler in dilute sulfuric acid is added to water, and cooled in an ice bath.

To each chilled coupler is added a 0.005 mole aliquot of the diazonium solution. The coupling mixture is treated with enough potassium acetate to neutralize the mineral acid. Water is added to the coupling mixture to a total volume of about 200 ml and the dyes collected by filtration, washed with 10% KCl solution, and dried in air. The dyes usually are admixed with about an equal weight of $K_2SO_4$ and are used for dyeing without further purification.

EXAMPLE NO.
4. N-Ethyl-N-(2-sulfatoethyl)aniline
5. N-Ethyl-N-(2-sulfatoethyl)-m-toluidine
6. N-(2-Sulfatoethyl)-o-toluidine To 2.0 g of conc. $H_2SO_4$ is added 0.5 g of Dye I with stirring. After complete solution is obtained, the solution is allowed to stand at about 30° C. for 15 min. A small amount of ice is added followed by 50% NaOH to pH of about 12. The mixture is evaporated to dryness at 60° C. and pulverized. Dyeings are carried out using this mixture of dye plus sodium sulfate without further purification. The dye produces bright orange shades on nylon carpet.

Particularly useful are the dyes of the formulae

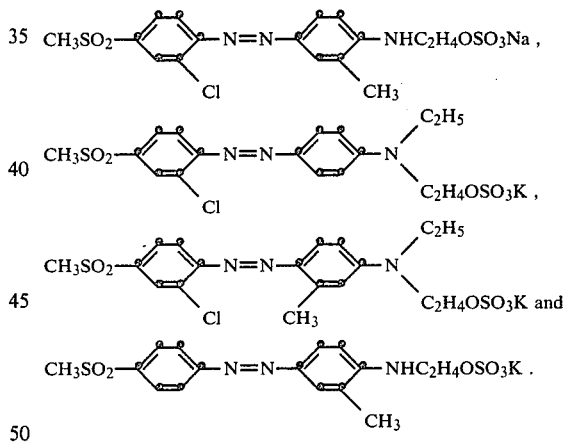

The dyes in the following table are prepared by the procedures illustrated above.

TABLE 1

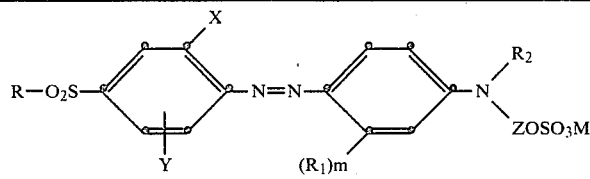

| R | X | Y | (R₁)m | R₂ | Z | M |
|---|---|---|---|---|---|---|
| CH₃ | Cl | H | H | —C₆H₅ | —CH₂CH₂— | K |
| " | " | " | " | —C₆H₁₁ | " | " |
| " | " | " | " | —C₂H₄OCH₃ | " | " |
| " | " | 5-Cl | 3-CH₃ | —C₂H₄CN | " | " |
| " | " | 6-Br | " | —C₂H₄CONH₂ | " | H⁺ |
| " | CH₃ | 6-Cl | " | —C₂H₄OC | " | " |
| " | OCH₃ | 6-Br | " | —C₂H₅ | —CH₂CH₂CH₂— | " |

TABLE 1-continued $$R-O_2S-\underset{Y}{\underset{|}{\overset{X}{\overset{|}{C_6H_3}}}}-N=N-\underset{(R_1)_m}{C_6H_3}-N\underset{ZOSO_3M}{\overset{R_2}{<}}$$

| R | X | Y | (R$_1$)m | R$_2$ | Z | M |
|---|---|---|---|---|---|---|
| " | Br | 6-Br | 2-CH$_3$ | H | —CH$_2$CH$_2$— | K$^+$ |
| " | H | H | 2-OCH$_3$—5-Cl | " | " | " |
| " | Br | " | 3-NHCOCH$_3$ | —CH$_2$CH$_2$N(COCH$_2$)(COCH$_2$) | " | " |
| " | Cl | " | 3-NHCOCH$_2$OCH$_3$ | —CH$_2$CH(CH$_3$)$_2$ | " | " |
| C$_2$H$_5$ | " | " | 3-NHCOCH$_2$Cl | —CH$_3$ | " | " |
| CH$_2$CH$_2$CH | " | " | 3-NHCOCH$_2$CH$_2$OH | —C$_2$H$_5$ | " | " |
| CH$_2$C$_6$H$_5$ | " | " | 3-NHCOC$_6$H$_{11}$ | " | " | " |
| CH$_2$CH(CH$_3$)$_2$ | " | " | 3-NHCOC$_6$H$_5$ | " | " | " |
| C$_6$H$_5$ | " | " | 3-Cl | " | " | " |
| C$_6$H$_{11}$ | " | " | 3-Br | " | " | " |
| CH$_2$CH$_2$OC$_2$H$_5$ | " | " | 3-CH$_3$ | " | " | " |
| CH$_2$CH$_2$C$_6$H$_5$ | " | " | " | " | —CH$_2$CH$_2$CH$_2$CH$_2$— | " |
| CH$_2$CH$_2$NHCOCH$_3$ | " | " | " | " | —CH$_2$CH(CH$_3$)— | " |
| CH$_2$CH$_2$OC$_2$H$_4$OC$_2$H$_5$ | " | " | " | —CH$_2$C$_6$H$_5$ | —CH$_2$CH(C$_6$H$_5$)— | " |
| NH$_2$ | Cl | H | " | —C$_2$H$_5$ | —CH$_2$CH$_2$— | Na |
| NHC$_2$H$_5$ | H | " | " | —CH$_2$CH$_2$OC$_2$H$_5$ | " | " |
| N(CH$_3$)$_2$ | Cl | " | 3-NHCONHC$_2$H$_5$ | —C$_2$H$_5$ | " | " |
| NHC$_6$H$_{11}$ | " | 6-Br | 3-NHCOOC$_2$H$_5$ | " | " | " |
| NHC$_6$H$_5$ | " | " | 3-NHCHO | " | " | " |
| NHC$_6$H$_4$—p-CH$_3$ | " | 5-Cl | 3-NHCOCH$_2$CN | " | " | " |
| NHC$_6$H$_4$—m-Cl | " | " | 3-NHCOCH$_2$OC$_6$H$_5$ | " | " | " |
| NHC$_6$H$_4$—o-OCH$_3$ | " | " | 3-NHCOCH$_2$C$_6$H$_5$ | " | " | " |
| NHC$_2$H$_4$OCH$_3$ | " | " | 3-NHSO$_2$CH$_3$ | —CH$_2$CH$_2$OSO$_3$Na | " | " |
| NHC$_2$H$_4$N(CO—CH$_2$)(CH$_2$—CH$_2$) | " | " | 3-NHSO$_2$C$_6$H$_5$ | —CH$_2$CH(CH$_3$)— | —CH$_2$CH(CH$_3$)— | " |
| NHC$_2$H$_4$OH | " | " | 3-CH$_3$ | —C$_2$H$_5$ | —CH$_2$CH(CH$_2$Cl)— | " |
| N(C$_2$H$_4$OH)$_2$ | " | " | " | " | —CH$_2$CH(OCH$_3$)— | " |
| N(CH$_3$)C$_2$H$_4$OH | " | " | " | " | —CH$_2$CH(C$_6$H$_5$)— | " |
| OC$_4$H$_9$-n | " | H | H | " | —CH$_2$CH$_2$— | " |
| OC$_6$H$_5$ | " | " | " | " | —CH$_2$CH(CH$_2$OC$_6$H$_5$)— | " |
| morpholino (N—O ring) | " | " | " | —CH$_2$CH$_2$N(CO—CH$_2$)(CH$_2$—CH$_2$) | —CH$_2$CH$_2$OCH$_2$CH$_2$— | " |
| CH$_2$CH$_3$ | " | " | " | —CH$_2$CH$_2$N(CO—C$_6$H$_4$—O) | —CH$_2$CH$_2$CH$_2$— | NH$_4^+$ |
| " | " | " | " | —CH$_2$CH$_2$NHSO$_2$CH$_3$ | —CH$_2$CH$_2$SCH$_2$CH$_2$— | " |
| " | " | 6-Br | " | —CH$_2$CH=CH$_2$ | —CH$_2$CH$_2$NHSO$_2$CH$_2$CH$_2$— | Na$^+$ |
| " | " | " | " | —CH$_2$-(oxirane) | —CH$_2$CH$_2$SO$_2$CH$_2$CH$_2$— | " |
| " | " | H | " | —CH$_2$CH$_2$OSO$_3$Na | —CH$_2$CH$_2$— | " |
| " | " | " | 3-CH$_3$ | —CH$_2$CH$_3$ | —CH$_2$CH$_2$N(SO$_2$CH$_3$)CH$_2$CH$_2$— | " |
| " | " | " | " | " | —CH$_2$CH$_2$N(COCH$_3$)CH$_2$CH$_2$— | " |
| " | " | " | " | " | —CH$_2$CH$_2$SO$_2$NHCH$_2$CH$_2$CH$_2$CH$_2$— | " |
| " | " | " | " | " | —CH$_2$CH$_2$CONHCH$_2$CH$_2$— | " |
| " | " | " | " | " | —CH$_2$CH$_2$NHCOCH$_2$— | " |
| " | " | " | " | " | —CH$_2$CH(OSO$_3$Na)CH$_2$— | " |
| " | " | " | " | " | —CH$_2$CH$_2$SO$_2$N(C$_6$H$_5$)CH$_2$CH$_2$— | " |
| C$_4$H$_9$—n | " | " | " | " | —CH$_2$CH$_2$NHCONHCH$_2$CH$_2$— | " |
| CH$_2$CH(CH$_3$)$_2$ | " | " | " | —CH$_2$CH$_2$COOCN$_3$ | —CH$_2$CH$_2$N(SO$_2$C$_6$H$_5$)CH$_2$CH$_2$— | " |
| CH$_2$CH$_2$OCOCH$_3$ | " | " | " | CH$_2$CH$_3$ | —CH$_2$CH$_2$SO$_2$N(CH$_3$)CH$_2$CH$_2$— | " |
| CH$_2$CH$_2$CH$_3$ | " | " | 3-SCH$_3$ | " | —CH$_2$CH$_2$CON(CH$_3$)CH$_2$CH$_2$— | " |
| CH$_3$ | " | " | 3-OC$_6$H$_5$ | " | —CH$_2$CH$_2$— | " |
| " | I | I | 3-CH$_3$ | —CH$_2$CH$_2$SO$_2$NH$_2$ | " | " |
| " | Cl | H | 3-CH$_2$OH | —CH$_2$CH$_2$NHCOCH$_3$ | " | " |
| " | " | " | 3-CH$_3$ | —CH$_2$C$_6$H$_{11}$ | " | " |

The invention has been described in detail with particular reference to certain preferred embodiments thereof, but it will be understood that variations and

We claim:
1. A compound of the formula:

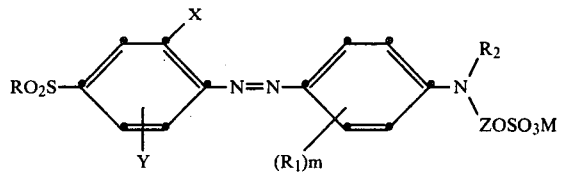

wherein R is selected from alkoxy, aryl, cycloalkyl, aryloxy, NH₂, NH alkyl, NH aryl, N(alkyl)₂, N(alkyl)aryl,

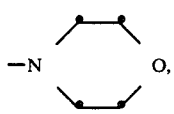

alkyl, and alkyl substituted with 1-3 groups selected from hydroxy, phenyl, alkoxy, alkoxyalkoxy, alkanoylamino, and alkanoyloxy; X is hydrogen, halogen, alkyl, or alkoxy; Y is hydrogen or halogen; $R_1$ is selected from hydrogen, alkyl, alkoxy, halogen, acylamido, alkylthio, and aryloxy; $R_2$ is selected from hydrogen, aryl, cycloalkyl, and alkyl; m is 0, 1, or 2; M is Na⁺, K⁺, H⁺, or NH₄⁺; Z is selected from straight or branched chain alkylene, and such alkylene substituted with aryl, halogen, OSO₃M, alkoxy, or aryloxy, —CH₂(CH₂)$_n$X—CH₂(CH₂)—$_p$, where n is 1, 2 or 3, p is 0, 1, 2 or 3, and X is O, S, SO₂, —SO₂NH—, —SO₂N(alkyl)—, SO₂N(aryl)—, —N(SO₂ aryl)—, —NHCO—, —NHCONH—, —N(SO₂ alkyl)—, and —CON(alkyl)—; wherein in all of the above groups containing alkyl, alkylene, or cyclic radicals, such radicals bear from 0—3 substituents selected from hydroxy, alkoxy, aryl, aryloxy, cyclohexyl, furyl, alkylcyclohexyl, aroyloxy, alkoxycarbonyl, alkanoyloxy, sulfamoyl, SO₂NH(aryl), SO₂NH(alkyl), SO₂N(dialkyl), NHCOO(alkyl), NHCONH(alkyl), alkanoylamino, lower alkylsulfonamido, succinimido, glutarimido, phthalimido, 2-pyrrolidono, cyano, carbamoyl, alkylcarbamoyl, alkoxyalkoxy, alkylthio, halogen, arylthio, alkylsulfonyl, and arylsulfonyl; wherein the alkyl or alkylene moieties of the above groups are straight or branched of 1-6 carbons; and wherein the aryl moieties of the above groups are of 6-12 carbons.

2. A compound according to claim 1 wherein R is selected from NH₂, NH alkyl, NH aryl, N(alkyl)₂, N(alkyl)aryl,

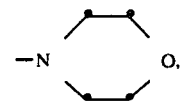

alkyl, and alkyl substituted with 1-3 groups selected from hydroxy, phenyl, alkoxy, alkoxyalkoxy, alkanoylamino, and alkanoyloxy; X is hydrogen, halogen; Y is hydrogen; $R_1$ is selected from hydrogen, alkyl, alkoxy; $R_2$ is selected from hydrogen and alkyl; m is 0, 1, or 2; M is Na⁺, K⁺, H⁺, or NH₄⁺; Z is selected from straight or branched chain alkylene, and such alkylene substituted with aryl, halogen, OSO₃M, alkoxy, or aryloxy, —CH₂(CH₂)$_n$X—CH₂(CH₂)—$_p$, where n is 1, 2 or 3, p is 0, 1, 2 or 3, and X is O, S, SO₂, —SO₂NH—, —SO₂N(alkyl)—, SO₂N(aryl)—, —N(SO₂ aryl)—, —NHCO—, —NHCONH—, —N(SO₂ alkyl)—, and —CON(alkyl)—; wherein in all of the above groups containing alkyl, alkylene, or cyclic radicals, such radicals bear from 0-3 substituents selected from hydroxy, alkoxy, aryl, aryloxy, cyclohexyl, furyl, alkylcyclohexyl, aroyloxy, alkoxycarbonyl, alkanoyloxy, sulfamoyl, SO₂NH(aryl), SO₂NH(alkyl), SO₂N(dialkyl), NHCOO(alkyl), NHCONH(alkyl), alkanoylamino, lower alkylsulfonamido, succinimido, glutarimido, phthalimido, 2-pyrrolidono, cyano, carbamoyl, alkylcarbamoyl, alkoxyalkoxy, alkylthio, halogen, arylthio, alkylsulfonyl, and arylsulfonyl; wherein the alkyl or alkylene moieties of the above groups are straight or branched of 1-6 carbons; and wherein the aryl moieties of the above groups are of 6-12 carbons.

3. The dye according to claim 1 having the formula

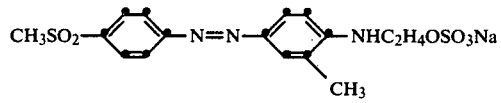

4. The dye according to claim 1 having the formula

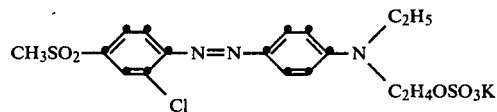

5. The dye according to claim 1 having the formula

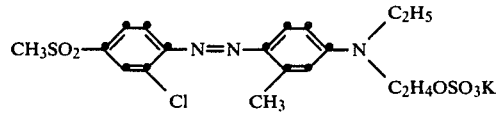

6. The dye according to claim 1 having the formula

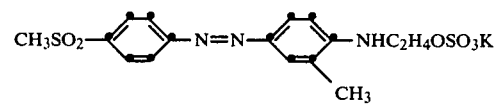

* * * * *